June 24, 1941.        M. KLAVIK        2,247,300
DRIVING UNIT FOR AUTOMOBILES
Filed July 26, 1939
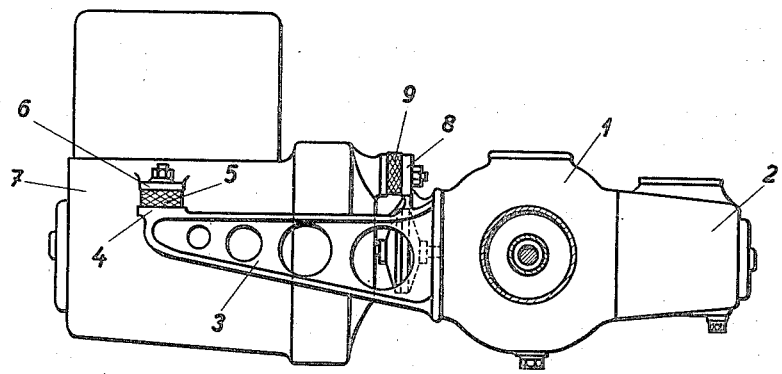
Inventor
Milos Klavik
By Linger, Ehlert, Stern & Carlberg
attys.

Patented June 24, 1941

2,247,300

UNITED STATES PATENT OFFICE 2,247,300

DRIVING UNIT FOR AUTOMOBILES

Miloš Klavík, Prague-Smichov, Czechoslovakia

Application July 26, 1939, Serial No. 286,718
In Czechoslovakia April 11, 1938

1 Claim. (Cl. 180—54)

In automobiles, particularly those having a streamlined body and motor at the rear, the driving unit comprising the motor, the driving member of the rear axles and the gear box, is mounted as a whole.

Of these three principal components forming the driving unit of the vehicle, the motor is the part that requires very frequent inspection and maintenance repairs, while the axle drive and the gear box on the whole do not require anything but a periodical renewal of the lubricating oil and a very seldom renewal of the bearings.

According to the invention, the connection between the motor and the two exchangeable parts of the driving unit is made more easily detachable than the connection between these individual parts, which if desired may also have a common casing. For the purpose of connection of the motor, the casing for the axle drive and the gear members is provided with a suitably constructed support on which the motor is resiliently mounted and a flexible coupling is interposed between the motor and the other portions of the driving unit.

Further advantages are simultaneously secured due to the fact that various vibrations, which are set up most readily in the balanced motor remain restricted to the motor alone and are not transmitted either to the members of the casing or to further parts of the automobile, as the unit may furthermore be connected to the automobile chassis by shock absorbing members, for example by intermediate rubber layers and the like.

The motor support which is connected to the common casing for the gear and driving members may be integral with the said casing, for example, by casting forked or similarly shaped frame brackets on to the casing, or it may be made as an independent casting or comprise a bracket stamped out of sheet steel and the like and bolted to the casing.

A constructional example of the invention is shown diagrammatically in the accompanying drawing.

The casing 1 containing the members of the axle drive is constructed integral with the gear casing 2 and carries on its end facing the motor a stamped, forked bracket 3, on which are mounted supporting bearings 4. The lugs 6 of the motor casing 7 rest on said bearings by means of intermediate rubber bearings 5. The third support on which the motor is mounted is constructed on the bracket 3 as a foot 8 for the intermediate rubber bearing 9. This foot may also be cast on to the casing 1.

I claim:

In a driving mechanism for automobiles, a motor having a casing and constituting a single unit, an axle-drive having a casing and a gear casing integral with said axle-drive casing, a forked bracket rigidly secured to said axle-drive casing and extending in a diametrically opposite direction to said gear casing, lugs on the sides of said motor casing, said forked bracket having supporting bearing elements, resilient bearing elements disposed between said lugs and said supporting bearing elements, means to secure said lugs and said resilient bearing elements to said supporting bearing elements, said forked bracket having a foot and said motor casing having a bearing element between which and said foot is secured a resilient bearing element, said motor being spaced from said axle-drive casing, and flexible means located in said space for connecting the motor shaft to the axle-drive shaft, the mounting connections between said bracket and said motor casing all being located above a plane containing the motor and axle-drive shafts.

MILOŠ KLAVÍK.